United States Patent
Nawa et al.

(10) Patent No.: US 7,870,801 B2
(45) Date of Patent: Jan. 18, 2011

(54) ROTATIONAL POWER TRANSFER DEVICE AND RELATED MANUFACTURING METHOD

(75) Inventors: Yukio Nawa, Gifu (JP); Mitsukazu Hattori, Kariya (JP); Yoshinori Yamaguchi, Kariya (JP)

(73) Assignee: Denso Corporation, Kariya (JP)

( * ) Notice: Subject to any disclaimer, the term of this patent is extended or adjusted under 35 U.S.C. 154(b) by 753 days.

(21) Appl. No.: 11/808,350

(22) Filed: Jun. 8, 2007

(65) Prior Publication Data

US 2008/0006104 A1  Jan. 10, 2008

(30) Foreign Application Priority Data

Jul. 10, 2006  (JP) .............................. 2006-189344

(51) Int. Cl.
  *F02N 15/02* (2006.01)
  *F02N 15/06* (2006.01)
  *F02N 15/00* (2006.01)
(52) U.S. Cl. .......................................... 74/7 C; 74/7 R
(58) Field of Classification Search ........................ 74/6, 74/7 R, 7 C, 467, 606 R; 192/55.1, 113.32, 192/113.34; 464/10, 30
  See application file for complete search history.

(56) References Cited

U.S. PATENT DOCUMENTS 4,523,668 A * 6/1985 Uematsu et al. ......... 192/107 M
4,895,035 A * 1/1990 Okamoto et al. .............. 74/7 A
5,418,400 A * 5/1995 Stockton ....................... 290/46

FOREIGN PATENT DOCUMENTS

| JP | A-3-269092 | 11/1991 |
| JP | A 05-171168 | 7/1993 |
| JP | A-2006-77805 | 3/2006 |

OTHER PUBLICATIONS

May 6, 2010 Office Action issued in Japanese Patent Application No. 2006-189344 (with translation).

* cited by examiner

*Primary Examiner*—Thomas R Hannon
*Assistant Examiner*—Justin Krause
(74) *Attorney, Agent, or Firm*—Oliff & Berridge, PLC

(57) ABSTRACT

A rotational power transfer device and a method of manufacturing the same are provided. The rotational power transfer device includes a first rotary member and a second rotary member. The first rotary member has an inner periphery formed with a solid lubricating layer composed of a chemical film and molybdenum disulfide. The second rotary member has an outer cylindrical periphery applied with a layer of grease including a mixture of oil with a higher frictional coefficient than that of lubricating oil and molybdenum disulfide. The second rotary member is press fitted to the first rotary member to allow the outer cylindrical periphery thereof to be placed in face-to-face relation to the inner cylindrical periphery of the first rotary member, enabling a rotational power in excess to be stably absorbed without causing any increase in the rotational power at which the slippage occurs.

8 Claims, 3 Drawing Sheets

FORWARD ←——→ REARWARD

FORWARD ←——→ REARWARD

ROTATIONAL POWER TRANSFER DEVICE AND RELATED MANUFACTURING METHOD

CROSS REFERENCE TO RELATED APPLICATIONS

This application is related to Japanese Patent Application No. 2006-189344, filed on Jul. 10, 2006, the content of which is hereby incorporated by reference.

BACKGROUND OF THE INVENTION

1. Technical Field of the Invention

The present invention relates to power transfer devices for transferring power between two component parts and, more particularly, to a rotational power transfer device, having first and second rotary members operative to interrupt a transfer of a rotational power when either the first and second rotary members is exerted with the rotational power exceeding a given value, and related manufacturing method.

2. Description of the Related Art

In the related art, an attempt has heretofore been made to provide rotational power transfer devices that are operative to interrupt a transfer of a rotational power in excess. One example of these devices is disclosed in, for instance, Japanese Patent Application Publication No. 5-171168. In this related art, the rotational power transfer device is employed in a starter and includes a clutch gear and a barrel. A lubricating layer, composed of a manganese phosphate film and a lubricating film, is formed on an inner periphery of the clutch gear and an outer periphery of the barrel. The lubricating film is composed of a mixture of molybdenum disulfide and resin. The clutch gear is press fitted to the barrel with the inner periphery held in face-to-face relation to the outer periphery of the barrel. In addition, the clutch gear and the barrel are so set such that as a rotational power is exerted between the clutch gear and the barrel at a value beyond a given value, a slippage occurs between these component parts.

With the starter employing such a power transfer device, a rotational power of an armature is transferred to the clutch gear via a drive gear and an idling gear. The drive gear, the idling gear and the clutch gear are coated with lubricating oil such as ester family oil or α-olefin family oil with a low frictional coefficient and high permeability with a view to preventing the occurrence of a wear. Lubricating oil scatters to surrounding areas with the rotation of the gears. It has been turned out that as scattered oil adheres onto the barrel and its vicinity and permeates to between the clutch gear and the barrel, a cleavage fracture takes place in molybdenum disulfide that form the lubricating film with a resultant increase in the frictional coefficient. As the frictional coefficient increases, there occurs an increase in the rotational power at which the slippage is caused to occur between the clutch gear and the barrel. Under such a situation, the clutch gear and the barrel become hard to absorb the rotational power in excess resulting from an impact occurring when the pinion is brought into meshing engagement with a ring gear of an internal combustion engine. This results in a fear of causing the gears and the armature to rupture.

SUMMARY OF THE INVENTION

The present invention has been completed with a view to addressing the above issues and has an object to provide a rotational power transfer device, operative such that even when oil such as lubricating oil with low frictional coefficient and high permeability intrudes to between associated component parts, the associated component parts suppresses an increase in the rotational power causing a slippage for thereby stably absorbing the rotational power in excess, and related manufacturing method.

The present inventor has undertaken committed research and development work through a trial and error process to address the above issues. Upon such research and development work, it is turned out that coating grease, composed of a mixture of oil with a higher frictional coefficient than that of lubricating oil and molybdenum disulfide, on either one of the inner periphery of the first rotary member and the outer periphery of the second rotary member enables the suppression of an increase in the rotational power at which a slippage occurs. Thus, the present invention has been completed with successful results.

To achieve the above object, a first aspect of the present invention provides a rotational power transfer device comprising a first rotary member having an inner cylindrical periphery, and a second rotary member, having an outer cylindrical periphery and press fitted to the first rotary member to allow the outer cylindrical periphery to be placed in face-to-face relation to the inner cylindrical periphery of the first rotary member, which is operative such that either the first rotary member or the second rotary member is imparted with a rotational power greater than a given value, a slippage occurs between the first rotary member and the second rotary member for interrupting a transfer of the rotational power. Grease composed of a mixture of oil with a higher frictional coefficient than that of lubricating oil and molybdenum disulfide is coated on at least one of the first rotary member and the second rotary member.

With grease, composed of the mixture of oil with the higher frictional coefficient than that of lubricating oil and molybdenum disulfide, which is coated on at least one of the first rotary member and the second rotary member, grease is associated with the solid lubricating layer to suppress a leakage of oil with a higher frictional coefficient than that of lubricating oil and can intervene between the first and second rotary members. The presence of grease containing molybdenum disulfide prevents impurities, causing a degraded variation in frictional coefficient, from intruding an intervening area between the first and second rotary members.

With the rotational power transfer device of the present embodiment, the first rotary member may preferably include a gear having an outer cylindrical periphery formed with gear teeth on which the lubricating oil is coated.

With such a structure, the rotational power can be reliably transferred from the first rotary member to the second rotary member via the gear.

With the rotational power transfer device of the present embodiment, the lubricating oil may preferably include at least one of ester family oil or α-olefin family oil.

With such a structure, the lubricating oil can prevent the gear from wearing.

With the rotational power transfer device of the present embodiment, the grease may preferably contain molybdenum disulfide in a proportion ranging from 50 to 70%.

With such a structure, such grease containing molybdenum disulfide in an optimum range prevents a leakage of oil with a higher frictional coefficient than that of lubricating oil, while providing improvement in workability of applying grease.

If grease contains molybdenum disulfide in a proportion less than 50%, a leakage of oil with a higher frictional coefficient than that of lubricating oil is liable to occur. Thus, the rotational power transfer device becomes hard to ensure reliable operating characteristics for a prolonged period of time.

On the contrary, if the concentration of molybdenum disulfide is greater than 70%, grease has increased viscosity, causing degraded workability to take place in coating grease. Therefore, grease is selected to contain molybdenum disulfide in a proportion ranging from 50 to 70% and, more preferably, in a proportion ranging from 55 to 65% in consideration of such issues. This precludes a leakage of oil with a higher frictional coefficient than that of lubricating oil, thereby improving the workability for grease to be coated.

With the rotational power transfer device of the present embodiment, at least one of the first rotary member and the second rotary member may further preferably include a lubricating layer composed of a chemical film, formed by chemical treatment, and molybdenum disulfide.

With such a structure, the presence of the lubricating layer enables the suppression of a further increase in the rotational power at which the slippage occurs.

A second aspect of the present invention provides a starter incorporating the rotational power transfer device according to claim 1. The starter comprises a motor, an output shaft rotatably driven with the motor, and a pinion carried on the shaft to be rotatable therewith. The first and second rotary members are disposed between the motor and the pinion for transferring the rotational power of the motor to the pinion and operative such that a rotational power, accompanied by an impact occurring when the pinion is brought into meshing engagement with a ring gear, exceeds a given value, a transfer of the rotational power from the pinion to the motor is interrupted.

With such a structure, even if lubricating oil intrudes an area between the first and second rotary members, no increases occurs in the rotational power at which the slippage occurs. In addition, the first and second rotary members can stably absorb the rotational power in excess resulting from an impact shock when the pinion is brought into meshing engagement with the ring gear. This allows the starter to have improved reliability in operation.

A third aspect of the present invention provides a rotational power transfer device comprising a rotary tubular member having an inner cylindrical periphery coated with a solid lubricating layer composed of a chemical film applied to the inner cylindrical periphery and a layer of molybdenum disulfide applied to the chemical film, and a rotary shaft member, having an outer cylindrical periphery and press fitted to the rotary tubular member to allow the outer cylindrical periphery to be placed in face-to-face relation to the inner cylindrical periphery of the rotary tubular member, which is operative such that either the first rotary member or the second rotary member is imparted with a rotational power greater than a given value, a slippage occurs between the rotary tubular member and the rotary shaft member for interrupting a transfer of the rotational power therebetween. A layer of grease is coated on at least one of a surface of the solid lubricating layer and the outer cylindrical periphery of the rotary shaft member and composed of a mixture of oil with a higher frictional coefficient than that of lubricating oil and molybdenum disulfide.

With such a structure of the rotational power transfer device, at least one of the first rotary member and the second rotary member is applied with grease composed of the mixture of oil with a higher frictional coefficient than that of lubricating oil and molybdenum disulfide. Grease is associated with the solid lubricating layer to suppress a leakage of oil with a higher frictional coefficient than that of lubricating oil and can intervene between the rotary tubular member and the rotary shaft member. The presence of grease containing molybdenum disulfide prevents impurities, causing a degraded variation in frictional coefficient, from intruding an intervening area between the rotary tubular member and the rotary shaft member.

A fourth aspect of the present invention provides a method of manufacturing a rotational power transfer device, the method comprising preparing a first rotary member having an inner cylindrical periphery, preparing a solid lubricating layer on the inner cylindrical periphery of the first rotary member by forming a chemical film thereon and applying a powder of molybdenum disulfide on a surface of the chemical film, preparing a second rotary member, conducting a heat treatment on the second rotary member, grinding a surface of an outer cylindrical periphery of the second rotary member, preparing a grease composed of a mixture of a lubricating oil with a high frictional coefficient and a powder of molybdenum disulfide, coating the grease on at least one of the first and second rotary members, and press fitting the first rotary member onto the second rotary member to allow the outer cylindrical periphery of the second rotary member to be placed in face-to-face relation to the inner cylindrical periphery of the first rotary member with the grease intervening between the solid lubricating layer and the outer cylindrical periphery of the second rotary member. The rotational power transfer device is operative such that either the first rotary member or the second rotary member is imparted with a rotational power greater than a given value, a slippage occurs between the first rotary member and the second rotary member for interrupting a transfer of the rotational power therebetween.

With such a method of manufacturing a rotational power transfer device, a layer of grease containing a mixture of oil having a high frictional coefficient and molybdenum disulfide intervenes between the solid lubricating layer of the first rotary member and the outer circumferential periphery of the second rotary member. This allows the rotational power transfer device to have increased reliability in operation for prolonged period of time.

DETAILED DESCRIPTION OF PREFERRED EMBODIMENTS

Now, a rotational power transfer device of an embodiment according to the present invention will be described below in detail with reference to the accompanying drawings. However, the present invention is construed not to be limited to such an embodiment described below and technical concepts of the present invention may be implemented in combination with other known technologies or the other technology having functions equivalent to such known technologies.

Now, a rotational power transfer device of an embodiment according to the present invention will be described below in detail with reference to FIGS. 1 to 3 of the accompanying drawings.

With the present embodiment, the rotational power transfer device will be described with reference to an exemplary case as applied to a starter for startup of an engine.

Figure 1:
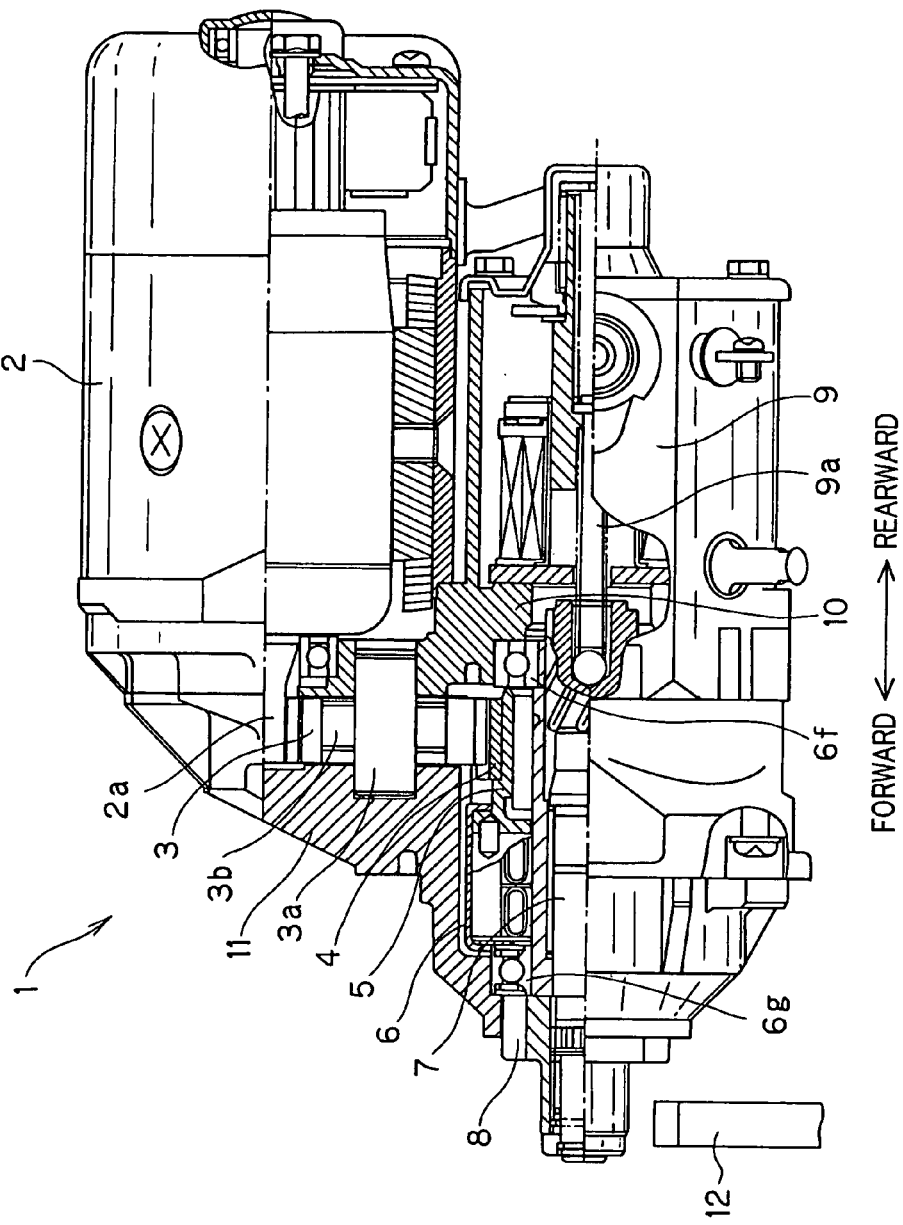
FIG. 1 is a partially cutaway cross sectional view of a starter employing a rotational power transfer device of an embodiment according to the present invention.
Figure 2:
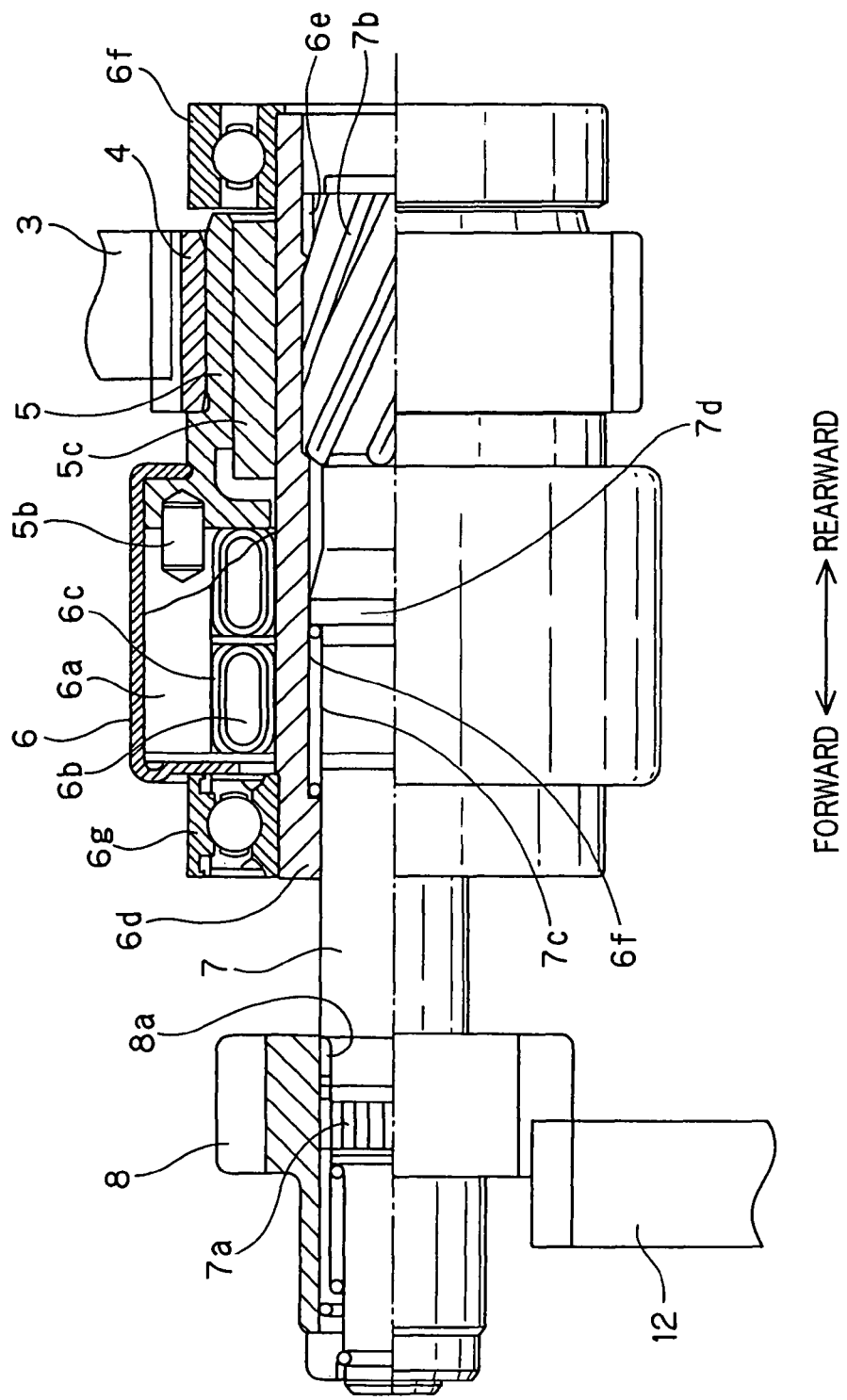
FIG. 2 is a partially cutaway cross sectional view of the rotational power transfer device of the embodiment shown in FIG. 1 in an enlarged scale.
Figure 3:
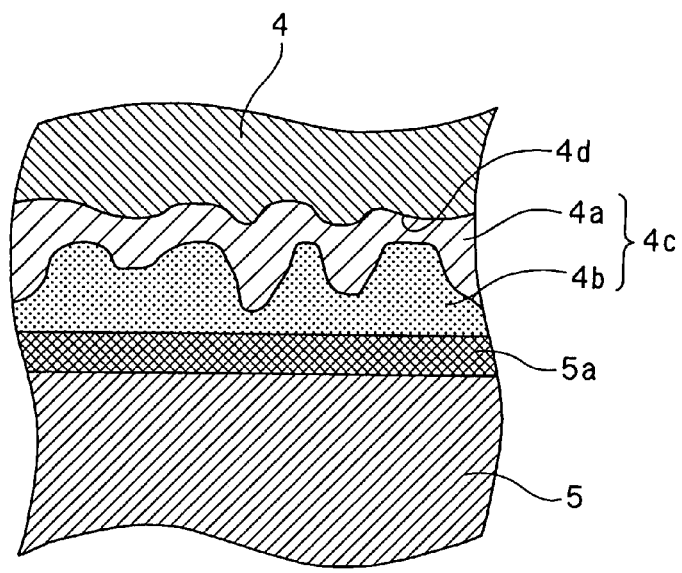
FIG. 3 is a fragmentary cross sectional view showing a clutch gear and a barrel, to which the rotational power transfer device of the embodiment is applied, in an enlarged scale.

First, reference is made to FIGS. 1 to 3 for describing a structure of the present embodiment. Here, FIG. 1 is a partially cross sectional view showing the starter incorporating the rotational power transfer device of the present embodiment. FIG. 2 is an enlarged cross sectional view showing a local area in the vicinity of a shaft. FIG. 3 is a partially enlarged view showing a clutch gear and a barrel implementing a concept of the present invention.

As shown in FIG. 1, the starter 1 includes a motor 2, an idling gear 3, a clutch gear 4 (first rotary member) playing a role as a tubular member, a barrel 5 (second rotary member) playing a role as a shaft member, a clutch 6, a shaft 7, a pinion 8, and an electromagnetic switch 9.

The motor 2 and the electromagnetic switch 9 are fixedly mounted onto a center case 10 in areas rearward of a housing 11. In addition, the idling gear 3, the clutch gear 4, the barrel 5, the clutch 6, the shaft 7 and the pinion 8 are located in an intermediate space between the center case 10 and the housing 11.

Hereunder, various components elements of the starter 1 will be described below further in detail. The motor 2 includes a direct current motor that generates a rotational power for starting up the engine. The motor 2 has an output shaft having its front end carrying thereon a drive gear 2a. The drive gear 2a has gear teeth to which, for instance, ester family oil or α-olefin family oil with a low frictional coefficient and high permeability is applied as lubricating oil for avoiding the occurrence of wear.

The idling gear 3 included a cylindrical gear made of metal and is held in meshing engagement with the drive gear 2a of the motor 2 for transferring the rotational power from the motor 2 to the clutch gear 4 at a reduced speed. The idling gear 3 is rotatably supported on an idling pin 3a, fixedly mounted to between the center case 10 and the housing 11, by means of rollers 3b. The idling gear 3 has gear teeth to which, for instance, ester family oil or α-olefin family oil with a low frictional coefficient and high permeability is applied as lubricating oil for minimizing the occurrence of wear.

As shown in FIGS. 1 and 2, the clutch gear 4 is composed of a cylindrical gear made of metal and held in meshing engagement with the idling gear 3 for transferring the rotational power from the idling gear 3 to the barrel 5 at a reduced speed.

As shown in FIG. 3, the clutch gear 4 has an inner circumferential wall 4d formed with a solid lubricating layer 4c (lubricating layer) composed of a chemical film 4a and a layer of molybdenum disulfide 4b.

In forming the solid lubricating layer 4c, the chemical film 4a is formed on the inner circumferential wall 4a of the clutch gear 4 by bonderizing treatments. Thereafter, powder of molybdenum disulfide 4b is coated on a surface of the chemical film 4a, upon which tumbling treatments are carried out. With such treatments, the solid lubricating layer 4c is formed on the inner circumferential periphery 4a of the clutch gear 4.

As shown in FIGS. 1 and 2, the gear teeth of the clutch gear 4 is coated with ester family oil or α-olefin family oil as lubricating oil in the same manner as that applied to the drive gear 2a and the idling gear 3.

The barrel 5 includes a substantially cylindrical member, made of metal, for transferring the rotational power from the clutch gear 4 to the clutch 6. As shown in FIG. 3, the barrel 5 has a cylindrical outer peripheral wall coated with a layer of grease 5a composed of a mixture including oil with a higher frictional coefficient than that of lubricating oil, coated on the gear teeth of the drive gear 2a, the idling gear 3 and the clutch gear 4, and molybdenum disulfide. Here, grease 5a contains molybdenum disulfide in a proportion ranging from 50 to 70%.

The barrel 5 is subjected to heat treatment and, subsequently, an outer periphery of the barrel 5 is grounded and applied with grease 5a. The clutch gear 4 is coupled to the barrel 5 by shrink fitting under a state where an inner surface of the solid lubricating layer 4c is held in face-to-face relation to the outer periphery of the barrel 5 coated with grease 5a. Here, the shrink fitting is conducted with a press-fitting margin determined for the clutch gear 4 and the barrel 5 such that if a rotational power beyond a given value is exerted to either the clutch gear 4 or the barrel 5, a slippage occurs between the clutch gear 4 and the barrel 5 to interrupt the rotational power to be transferred therebetween.

As shown in FIGS. 1 and 2, the barrel 5 is fixedly secured onto an outer 6a, which will be described later, via a pin 5b and rotatably supported on an inner 6d, which will be described later, via a bearing 5c.

Thus, the barrel 5 plays a role as a device that transfers the rotational powers of the clutch 6 and the barrel 5 to the shaft 7 while when a rotational speed of the shaft 7 exceeds a rotational speed of the barrel 5, the barrel 5 runs idle to interrupt the rotational power being transferred. The clutch 6 includes the outer 6a, rollers 6b, springs 6c and the inner 6d. The clutch outer 6a is fixedly secured to the barrel 5. The rotational power of the barrel 5 fixed to the outer 6a is transferred to the inner 6b that is pressed with the spring 6c. The inner 6d has an inner peripheral wall formed with a helical spline 6e. The inner 6d is rotatably supported with the center case 10 and the housing 11 via bearings 6f, 6g.

The shaft 7 is a cylindrical member, made of metal, which is operative such that upon pushing movement of the electromagnet switch 9, the shaft 7 moves in an axial direction while transferring the rotational power from the inner 6d to the pinion 8. The shaft 7 has a front end portion whose outer periphery is formed with a straight spline 7a and a rear end portion formed with a helical spline 7b. Under a status where the helical spline 7b held in coupling engagement with the helical spline 6e of the inner 6d, the shaft 7 is supported to be internally movable back and forth in an axial direction. In addition, the inner 6d has an inner bore 6f accommodating therein a return spring 7c that is held in contact with an annular shoulder portion 7d of the shaft 7 to press the shaft 7 rearward with respect to the inner 6d.

The pinion 8 is a substantially cylindrical gear in meshing engagement with a ring gear 12 of an internal combustion engine (not shown) to transfer the rotational power from the shaft 7 to the engine for cranking up operation thereof. The pinion 8 is internally formed with a straight spline 8a. The pinion 8 is slidably supported on the front end portion of the shaft 7 under a condition where the straight spline 8a is held in coupling engagement with the straight spline 7a of the shaft 7.

Now, the operation of the starter 1 will be described below with reference to FIGS. 1 and 3.

In the starter 1 shown in FIG. 1, as an ignition switch (not shown) is turned on, the electromagnetic switch 9 is energized. In this moment, the electromagnetic switch 9 generates an electromagnetic force causing a plunger 9a to protrude forward. With such protruding movement of the plunger 9a, contacts of the electromagnetic switch 9 are closed, thereby supplying the motor 2 with D.C. electric power. Thus, the motor 2 is turned on to rotate generating a rotational power to start up the engine. The rotational power of the motor 2 is transferred from the drive gear 2a to the clutch 6 through the idling gear 3, the clutch gear 4 and the barrel 5. In addition, the rotational power is further transferred from the shaft 7 to the pinion 8, which is consequently rotatably driven. When this takes place, the forward movement of the plunger 9a causes the shaft 7 to move forward.

During such forward movement of the shaft 7, the pinion 8 is brought into meshing engagement with the ring gear 12 of the engine for cranking up the same. During a moment in which the pinion 8 in rotation is brought into meshing engagement with the ring gear 12 remaining stationary, an impact force instantaneously acts on the pinion 8 during meshing engagement between the pinion 8 and the ring gear 12. The impact force acts as a reverse rotational power that is transferred from the pinion 8 to the barrel 5 via the shaft 7 and the clutch 6. If such a rotational power exceeds a given value, a slippage occurs between the clutch gear 4 and the barrel 5. Therefore, no probability occurs for the rotational power, derived from such an impact force, to be transferred in excess to the clutch gear 4, the idling gear 3, the drive gear 2a and the motor 2.

Further, as the pinion 8 drives the ring gear 12 upon which the rotational speed of the ring gear 12 increases, the rotation of the pinion 8 becomes hard to follow the rotation of the ring gear 12. In this moment, an inertia force of the ring gear 12 applies a force to cause the pinion 8 to rotate. Thus, an impact force occurs when such a force is transferred to the clutch gear 4 and the barrel 5. This causes a slippage to take place between the clutch gear 4 and the barrel, thereby interrupting the impact force from being transferred to the motor 2. Thereafter, as the ring gear 12 reaches an igniting rotational speed, the engine is started up.

As the engine is started up to cause the ignition switch to be turned off, the supply of electric power to the electromagnetic switch 9 is shutoff. In this moment, the shaft 7 and the plunger 9a are pressed by the action of the return spring 7c to move rearward. Upon rearward movement of the shaft 7, the pinion 8 is disengaged from the ring gear 12. In addition, upon rearward movement of the plunger 9a, the contacts of the electromagnetic switch 9 are turned off, thereby shutting off the supply of electric power to the motor 2. Accordingly, the motor 2 is turned off, thereby completing the startup operation of the engine.

Meanwhile, the drive gear 2a, the idling gear 3 and the clutch gear 4 rotate while scattering lubricating-oil droplets in surrounding areas around these component elements. The scattered lubricating-oil droplets adhere onto the barrel 5 and its vicinity, resulting in a probability for the lubricating-oil droplets to intrude to between the clutch gear 4 and the barrel 5.

As shown in FIG. 3, however, the layer of grease 5a intervenes between the clutch gear 4 and the barrel 5 and no probability takes place for the frictional coefficient to increase during the slippage between the clutch gear 4 and the barrel 5. Thus, the clutch gear 4 and the barrel 5 absorb the rotational power in excess in a highly stabilized manner.

The starter 1 of the present embodiment mentioned above has advantageous effects as described below.

With the starter 1 of the present embodiment, even if the lubricating-oil droplets intrude to between the clutch gear 4 and the barrel 5, the clutch gear 4 and the barrel 5 do not increase the rotational power at which a slippage occurs, while absorbing the rotational power in excess in a highly stabilized manner. This allows the starter 1 to have increased reliability in operation. The presence of grease 5a between the solid lubricating layer 4c of the clutch gear 4 and the outer periphery of the barrel 5 prevents a leakage of oil with a higher frictional coefficient than that of lubricating oil. This ensures grease 5a to reliably stay in a region between the clutch gear 4 and the barrel 5. With grease 5a arranged to contain molybdenum disulfide, no probability exists for impurities to intrude to the region between the clutch gear 4 and the barrel 5, thereby suppressing the occurrence of adverse affects causing the frictional coefficient to vary.

With the starter 1 of the present embodiment, further, grease 5a contains molybdenum disulfide in a proportion ranging from 50 to 70%. This prevents a leakage of oil with a higher frictional coefficient than that of lubricating oil, while providing improvement in workability for grease to be coated 5a onto the outer periphery of the barrel 5.

If grease 5a contains molybdenum disulfide in a proportion less than 50%, a leakage of oil with a higher frictional coefficient than that of lubricating oil is liable to occur. Thus, the rotational power transfer device becomes hard to ensure reliable operating characteristics for a prolonged period of time. On the contrary, if the concentration of molybdenum disulfide is greater than 70%, grease 5a has increased viscosity, causing degraded workability to take place in coating grease 5a onto the outer periphery of the barrel 5. Therefore, the presence of grease 5a containing molybdenum disulfide in a proportion ranging from 50 to 70% precludes a leakage of oil with a higher frictional coefficient than that of lubricating oil, thereby improving the workability for grease to be coated 5a onto the outer periphery of the barrel 5.

With the starter 1 of the present embodiment, furthermore, the solid lubricating layer, composed of the chemical coating 4a and the molybdenum disulfide layer 4b, is formed in a region between the clutch gear 4 and the barrel 5. This enables further elimination of an increase in the rotational power at which a slippage is caused to occur.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A rotational torque transfer device comprising:
   a first rotary member having an inner cylindrical periphery, and further including a gear having an outer cylindrical periphery formed with gear teeth on which lubricating oil is coated; and
   a second rotary member, having an outer cylindrical periphery and press fitted to the first rotary member to allow the outer cylindrical periphery to be placed in face-to-face relation to the inner cylindrical periphery of the first rotary member, which is operative such that when either the first rotary member or the second rotary member is imparted with a rotational torque greater than a given value, a slippage occurs between the first rotary member and the second rotary member for interrupting a transfer of the rotational torque,
   wherein a grease composed of a mixture of oil and molybdenum disulfide is coated on at least one of the first rotary member and the second rotary member, the oil having a higher frictional coefficient than that of the lubricating oil, the lubricating oil including at least one of ester family oil or α-olefin family oil and the grease containing molybdenum disulfide in a proportion ranging from 50 to 70%.

2. The rotational torque transfer device according to claim 1, wherein:

at least one of the first rotary member and the second rotary member further includes a lubricating layer composed of a chemical film, formed by chemical treatment, and molybdenum disulfide.

3. A starter incorporating the rotational torque transfer device according to claim 2, comprising:
   a motor for generating the rotational torque, outputting the rotational torque to an output shaft adapted to be rotatably driven by the motor;
   a pinion receiving the rotational torque generated by the motor; and
   a ring gear receiving the rotational torque of the pinion via a driving shaft, the pinion being carried on the driving shaft to be rotatable therewith, the ring gear transferring the rotational torque to the engine,
   wherein the first and second rotary members are disposed between the motor and the pinion for transferring the rotational torque of the motor to the pinion and operative such that when a rotational torque, accompanied by an impact occurring when the pinion is brought into meshing engagement with the ring gear, exceeds a given value, a transfer of the rotational torque from the pinion to the motor is interrupted.

4. A starter for starting an engine, incorporating the rotational torque transfer device according to claim 1, comprising:
   a motor for generating the rotational torque and outputting the rotational torque to an output shaft adapted to be rotatably driven by the motor;
   a pinion receiving the rotational torque generated by the motor; and
   a ring gear receiving the rotational torque of the pinion via a driving shaft, the pinion being carried on the driving shaft to be rotatable therewith, the ring gear transferring the rotational torque to the engine;
   wherein the first and second rotary members are disposed between the motor and the pinion for transferring the rotational torque of the motor to the pinion and operative such that when a rotational torque, accompanied by an impact occurring when the pinion is brought into meshing engagement with the ring gear, exceeds a given value, a transfer of the rotational torque from the pinion to the motor is interrupted.

5. A rotational torque transfer device comprising:
   a rotary tubular member having an inner cylindrical periphery coated with a solid lubricating layer composed of a chemical film applied to the inner cylindrical periphery and a layer of molybdenum disulfide applied to the chemical film;
   a rotary shaft member, having an outer cylindrical periphery and press fitted to the rotary tubular member to allow the outer cylindrical periphery to be placed in face-to-face relation to the inner cylindrical periphery of the rotary tubular member, which is operative such that when either the first rotary member or the second rotary member is imparted with a rotational torque greater than a given value, a slippage occurs between the rotary tubular member and the rotary shaft member for interrupting a transfer of the rotational torque therebetween; and
   a layer of grease coated on at least one of a surface of the solid lubricating layer and the outer cylindrical periphery of the rotary shaft member, the layer being composed of a mixture of oil and molybdenum disulfide, the oil having a higher frictional coefficient than that of lubricating oil applied to a gear on an outer periphery of the rotary tubular member,
   wherein the lubricating oil includes at least one of ester family oil or α-olefin family oil and the grease contains molybdenum disulfide in a proportion ranging from 50 to 70%.

6. The rotational torque transfer device according to claim 5, wherein:
   the rotary tubular member includes a gear having an outer cylindrical periphery formed with gear teeth on which the lubricating oil is coated.

7. The rotational torque transfer device according to claim 5, wherein:
   the layer of grease is coated on the outer cylindrical periphery of the rotary shaft member.

8. A starter for starting an engine, incorporating the rotational torque transfer device according to claim 5, comprising:
   a motor for generating the rotational torque and outputting the rotational torque to an output shaft adapted to be rotatably driven with the motor;
   a pinion receiving the rotational torque generated by the motor; and
   a ring gear receiving the rotational torque of the pinion via a driving shaft, the pinion being carried on the driving shaft to be rotatable therewith, the ring gear transferring the rotational torque to the engine,
   wherein the rotary tubular member and the rotary shaft member are disposed between the motor and the pinion for transferring the rotational torque from the motor to the pinion and operative such that when a rotational torque, accompanied by an impact occurring when the pinion is brought into meshing engagement with a ring gear, exceeds a given value, a transfer of the rotational torque from the pinion to the motor is interrupted.

* * * * *